No. 722,739. PATENTED MAR. 17, 1903.
H. B. MERRIAM.
AUTOMATIC INSPECTION TRACK GAGE.
APPLICATION FILED APR. 23, 1902.
NO MODEL.
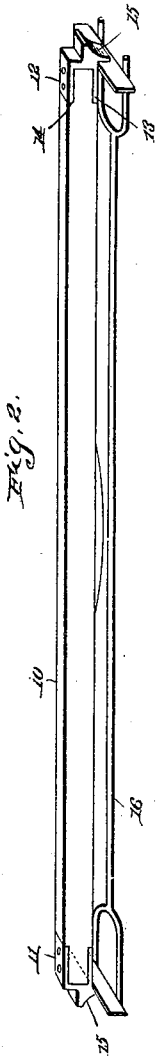
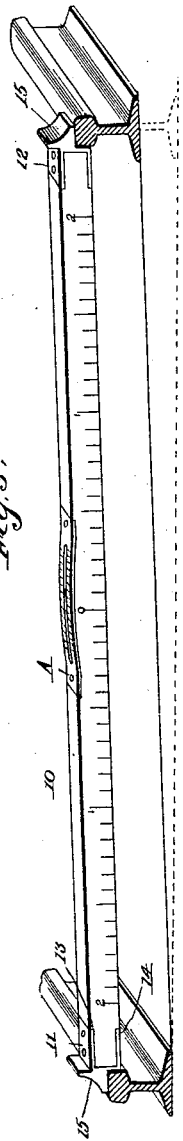
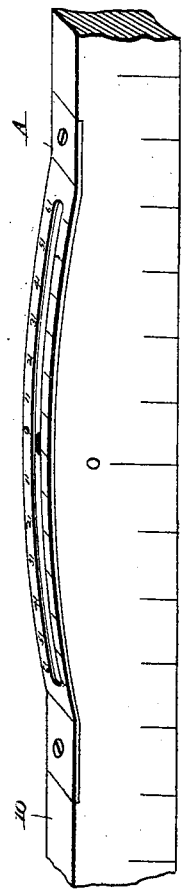
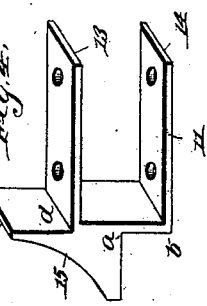

UNITED STATES PATENT OFFICE.

HARRY B. MERRIAM, OF DUBUQUE, IOWA.

AUTOMATIC INSPECTION TRACK-GAGE.

SPECIFICATION forming part of Letters Patent No. 722,739, dated March 17, 1903.

Application filed April 23, 1902. Serial No. 104,415. (No model.)

*To all whom it may concern:*

Be it known that I, HARRY B. MERRIAM, a citizen of the United States, residing at Dubuque, in the county of Dubuque and State of Iowa, have invented a new and useful Automatic Inspection Track-Gage, of which the following is a specification.

The object of this invention is to provide improved means for determining the gage or width between the rails of a railway-track and coincident therewith ascertain and determine the relative elevations of the tread-surfaces of said rails both in respect of said tread-surfaces occupying a common level and occupying different levels.

A further object of this invention is to be found in the provision of means for determining the accuracy of a foreman's track-gage in respect of the desired width of the track between the rails.

My invention consists in the construction, arrangement, and combination of elements hereinafter set forth, pointed out in my claims, and illustrated by the accompanying drawings, in which—

Figure 1 is a perspective view illustrating the construction of my device and the use thereof as a track-gage, the tread-surfaces of the track-rails occupying the same horizontal plane. Fig. 2 is a perspective view illustrating the construction of my device and the use thereof in determining the accuracy of a foreman's track-gage. Fig. 3 is a perspective view illustrating the construction of my device and the use thereof in determining the relative elevations of track-rails, as well as the gage thereof. Fig. 4 is a detailed perspective view of one of the gage-heads of my improved device detached from the connecting-bar. Fig. 5 is a perspective view in detail illustrating the curved glass bubble-tube and its application to the connecting or level bar of my device.

In the construction of the device as shown the numeral 10 designates a bar, preferably made of wood and provided with a scale or graduation on one of its side faces. The bar 10 should be straight and have its upper and lower faces plane and true except in the central portion of its upper face, at which point the surface swells outwardly on an arc, the center of the arc alining with or being on a radial line from the center of the bar and the central index (zero) of the scale or graduation. A curved glass spirit-bubble tube is mounted on the top and center of the bar, with its convex surface upward, its concave surface contacting with the curved or swelled portion of the upper face of the bar. The tube is covered with a metal strap A, secured by its ends to the bar, and said strap is formed with a slot in and longitudinally of its central portion proximately the length of the tube. The strap A is provided with a graduated scale on either side of the tube and extending in opposite directions from the center of said tube and from the zero-index in the center of the strap, as illustrated in Fig. 5, and this graduation is so arranged that for each inch of superelevation of either rail of the track the bubble in the tube will move one space along the scale. By thus mounting the tube upon the bar the spirit-bubble in the tube is made to indicate when the tread-surfaces of the rails are occupying the same horizontal plane or the track is level or the amount of elevation at either rail thereof without reversing, inverting, or transposing the ends of the bar.

It is desirable to determine and fix accurately the length or gage of the bar 10, and for such purpose I have provided gage-heads 11 12 of like construction and shape and arranged for mounting on end portions of the bar. Each of the heads 11 12 is formed, preferably, of metal by molding, and consists of arms 13 14, parallel with each other and arranged to embrace the upper and lower faces of the bar 10 and be countersunk therein and fixed thereto. The outer end portions of the arms 13 14 are connected by the body portion of the gage-head integrally. A lip 15 is formed on and extends outwardly from the body portion of the gage-head, and the lower face of said lip is plane and parallel with the lower face of the bar 10. The face *b* of the body portion of the gage-head forms the shoulder of said gage-head and is at right angles to the lower face of the lip 15 and joins the inner end of said lower face of the lip by a right angle at *a* in Fig. 4. Each of the gage-heads 11 12 being formed with the lips and the plane faces *b* adjoining said lips with right angles at *a*, and the plane faces of the lips being in the same plane and parallel with the plane of the lower face of the bar 10, it follows that when the device is mounted on rails, as illustrated in Figs. 1 and 3, the plane face of the lips will rest on the tread-surfaces of the rails and the level or inclined relations of said tread-surfaces would be indicated by the spirit-bubble in the curved glass tube on the central portion of the bar 10. At the same time the plane faces b of the body portions of the gage-heads will contact snugly with the inner margins of the treads of the rails and determine the accuracy of the gage or spacing apart of the rails of the track. Lips c are formed on and extend from the body portions of the gage-heads at right angles to the lips 15 and the inner faces of said lips c are plane and in alinement with the plane faces b. The faces d of the lips c form the shoulders of a gage-tester reverse to the gage and are spaced apart a distance equal to the spacing apart of the plane faces b of the gage-heads and form hooks to receive between them the heads of the foreman's track-gage 16, as illustrated in Fig. 2, and determine, verify, and ascertain the accuracy of said foreman's track-gage. The graduation or scale on the side of the bar 10 extends in opposite directions from zero in center of said bar and is indicated in feet and inches for the purpose of determining the center of the track and its agreement or otherwise with the engineer's center stakes.

It is intended that this device shall be used by road-masters, track-supervisors, and inspectors, whose duties include testing the gages of track-foremen and determining quickly the amount of elevation of either rail of the track, as well as testing the gage of the track and the relative position of the center of the track with reference to the engineer's center stakes.

In practical use for testing the gage of the track the device is employed as shown in Fig. 1, the close contact of the plane faces b of the gage-heads with the inner margins of the rail-treads indicating and determining the accuracy of the gage. In testing the accuracy of the gages of track-foremen the device is employed, as illustrated in Fig. 2, by turning the device upside down and fitting it over the foreman's gages. It is desirable and preferable to use a radial track-gage. In using the device for determining the level of the track or the amount of elevation of either rail relative to the other the bar is placed, as illustrated in Figs. 1 and 3, with the plane faces of the lips 15 in contact with the tread-surfaces of the rails, and the amount of elevation of either rail is determined by reading the number of spaces from the center of the graduated scale A opposite the position taken by the spirit-bubble in the glass tube, which gives the number of inches of elevation of either rail relative to the other, as illustrated in Fig. 3. In using the device for determining the relative position of the center of the track with reference to the engineer's center stakes the operator reads the scale of feet and inches from the zero of the graduation on the face of the gage to the right or left of zero to the center stake, the number of feet and inches thus shown upon the scale being the distance the track will have to be moved to bring it to the true center.

It will be observed that the gage of the track, the level of the track, the amount of elevation of either rail, and the true alinement of the track can be determined at once simply by placing the device upon the rails.

What I claim as my invention, and desire to secure by Letters Patent, is—

1. A track-gage, consisting of a bar, a metal gage-head mounted on each end of said bar, a shoulder in each metal gage-head and a lip opposite to said shoulder formed with a plane face in the plane of the face of the shoulder and forming the track-gage tester reversed to the gage.

2. A track-gage, consisting of a bar, a metal gage-head on each end of said bar, the plane in said gage-head forming the shoulder of said gage, being a continuation of a plane in the gage forming the shoulder of a gage-tester reversed to the gage, and a scale of feet and inches along the side of said bar extending in opposite directions from zero in the center of said bar.

3. A track-gage, consisting of a bar, metal gage-heads on said bar, a gage-shoulder formed on each gage-head and a gage-tester shoulder formed on each gage-head opposite to and in alinement with the gage-shoulders, a scale of feet and inches along one side of the bar extending in opposite directions from zero in the center of said bar, a curved glass spirit-bubble tube mounted on the top and center of said bar with its convex side outward, the ends of said tube occupying the same relative position with reference to the top surface of said bar, a strap of metal extending over said tube and secured by its ends to said bar, said strap having a slot extending longitudinally through its central portion the length of said tube, and a graduated scale extending in opposite directions on said strap from zero in the center of the strap.

HARRY B. MERRIAM.

Witnesses:
BENJ. G. FULLER,
J. E. ADAMSON.